(No Model.)
W. B. POTTER.
CONTROLLING ELECTRIC MOTORS.
No. 549,153. Patented Nov. 5, 1895.
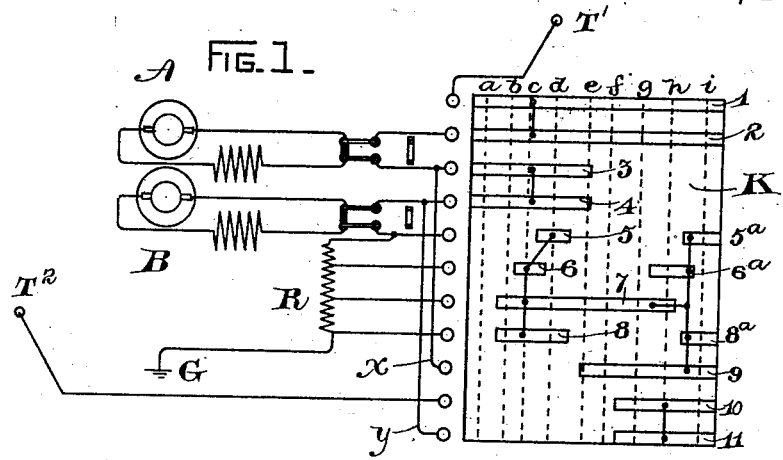
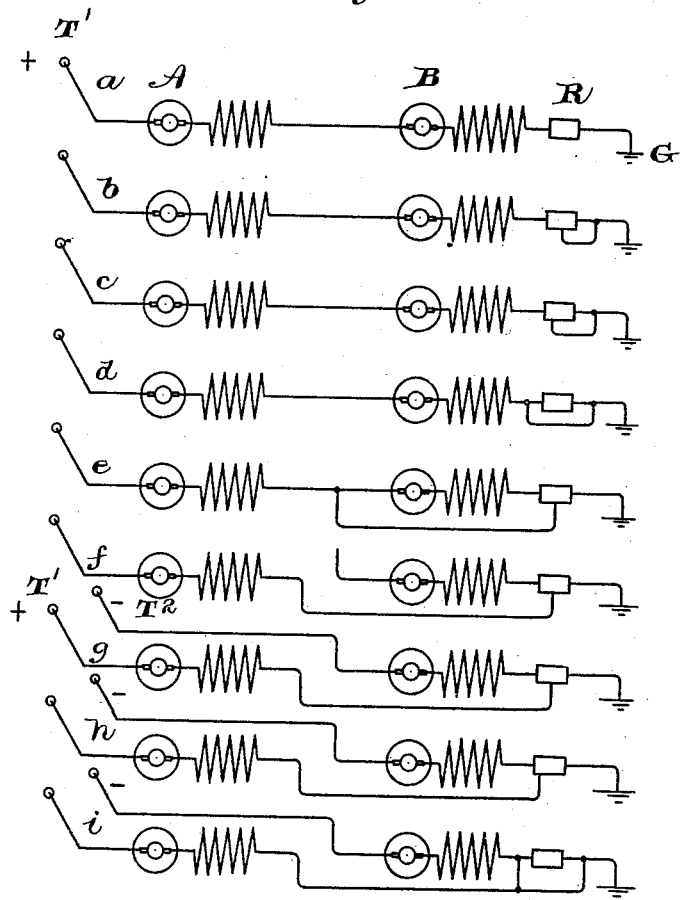
Witnesses
A. F. Macdonald.
B. B. Hull
Inventor
William B. Potter,
by Geo. R. Blodgett,
Atty.

UNITED STATES PATENT OFFICE.

WILLIAM B. POTTER, OF SCHENECTADY, NEW YORK, ASSIGNOR TO THE GENERAL ELECTRIC COMPANY, OF NEW YORK.

CONTROLLING ELECTRIC MOTORS.

SPECIFICATION forming part of Letters Patent No. 549,153, dated November 5, 1895.

Application filed August 8, 1895. Serial No. 558,599. (No model.)

*To all whom it may concern:*

Be it known that I, WILLIAM B. POTTER, a citizen of the United States, residing at Schenectady, in the county of Schenectady, State of New York, have invented certain new and useful Improvements in Controlling Electric Motors by the Three-Wire System, (Case No. 261,) of which the following is a specification.

My invention relates to the control of electric motors, especially to those operated by continuous currents, and has for its object to provide a system of control and an apparatus for carrying out the system by which two motors may be regulated from rest to their highest speed, employing at the same time the commercial economies of the now well-known series-multiple or three-wire system.

In my application, Serial No. 556,690, filed July 22, 1895, I have illustrated and described a system especially adapted for an electric railway, in which four motors are employed, divided into two groups of two, one group upon each side of the three-wire system, in which the positive and negative conductors are represented by trolley-lines and the neutral by the track or ground return. In the present system I aim to employ the same arrangements, except that in this case I ordinarily use only two motors. In the case referred to I have made claims which are sufficient in scope in their broadest aspect to include the subject-matter of this case; but in this case I aim to claim specifically the arrangement and method of operating two motors, and therefore the claims which I make herein are not to be construed as broad enough to cover matter shown in my application referred to, except in the more particular aspect of my invention presently to be referred to.

The accompanying drawings illustrate my invention, Figure 1 being a development of a cylindrical switch adapted to carry out its purposes, the motors, resistances, and trolleys being indicated diagrammatically. Fig. 2 is a series of diagrams showing the different combinations of motor and resistance.

I have not illustrated the mechanical arrangement of the controller, inasmuch as cylindrical switches of the type herein shown are now well known in the art and do not require extended description. The particular mechanism of controller which I have employed is substantially similar to that shown in my Patent No. 524,396, issued August 14, 1894, to which reference may be had for more full description.

The broadest aspect of my present invention is that improvement in the art of controlling continuous-current electric motors by the three-wire system, which consists in connecting one of them between the positive conductor and the ground, which is taken as the neutral, and the other between the negative conductor and ground, and then regulating the motors simultaneously or successively, it being understood that the ground connection is maintained at all times, (wherein my improved system differs from any now in use,) and also that the motors are preferably connected or geared to a common load. In its more particular aspects, however, to which reference has been made, my invention consists, also, in a particular combination of the two motors, and especially in the fact that before making the change and connecting the two motors between the ground and the respective outside lines I first shunt one of the motors and then break the connection between it and the other, establishing a connection between that motor and the second outside line. I do not mean, however, to limit myself to the use of the ground return as a neutral by this statement of invention, for it is manifest that another arrangement might be adopted in which some other conductor would take the place of the ground as a neutral. In some classes of stationary work, particularly, this would be preferred.

Referring now to Fig. 1, in the first position of the controller K (the two trolleys being respectively marked T' and $T^2$, the motors A and B, and the resistance R) the current would enter from the trolley T' to contact 1, by cross-connection to contact 2, through the motor A to contact 3, by cross-connection to contact 4, and through the motor B and the resistance R to ground, being the combination shown in the diagram *a*, Fig. 2, corresponding to the dotted line *a* upon the controller K. The diagrams *b c d* indicate the next three steps of the controller, respectively, until the contact-plate 5 is reached, which short-circuits the resistance, as shown in diagram $d$, the intermediate steps being to cut out portions of the resistance and thus increase the speed. At position $e$ a shunt is thrown around the motor B, and preferably includes a part of the resistance R, the entire resistance being in series with the motor B, but only a part of it in shunt thereto or in series with the motor A. The path of the current in this case is from the trolley T' to contact 1, to contact 2, through the motor A, contact 3, by cross connection to contact 4, and the resistance R to ground at G. The second path is from the trolley T through the contact-plates 1 and 2 and the motor A, as before; but branching at the contact 3 it passes by the lead $x$ to contact-plate 9 upon the controller, thence by cross connection to contact-plate 7, and out through a part of the resistance R to ground at G. This is the shunt around the motor B. The path through that motor is, as before, through the first motor to contact-plate 3, thence by cross connection to contact-plate 4, then through the motor, and through the entire resistance to ground at G.

In position $f$ of the controller the connection between the two motors is opened by the brushes passing off the contact-plates 3 and 4. The path through the motor A is, however, still complete, as shown in the diagram, because the lead $x$ is connected by its brush to the contact-plate 9, thence by cross connection to the contact-plate 7, and through part of the resistance to ground. The motor B is, however, open-circuited, because its terminals in this position are disconnected from the trolley.

In the position $g$ the motor B is connected to the minus side (indicated by the trolley $T^2$) by means of the contact-plates 10 and 11, which at this point connect their respective brushes by means of the cross-connection. The path of the current then is from the trolley T' through the contact-plates 1 and 2 and the motor A and lead $x$ to contact-plate 9, by cross connection to contact-plate 7, thence through a part of the resistance to ground, and from trolley $T^2$ to contact-plate 10, by cross-connection to contact-plate 11, thence by the lead $y$ through the motor B, and through the entire resistance to ground. The next two steps of the controller are resistance steps, as indicated in the diagrams $h\ i$—that is, the resistance is first partly and then completely short-circuited, so that in the last position the two motors are running in series between the two trolleys with an intermediate ground connection, giving, as is well understood, five hundred volts difference of potential between their terminals.

What I claim as new, and desire to secure by Letters Patent of the United States, is—

1. The art of controlling electric motors by the three-wire system, which consists in connecting the two motors between an outside main and the neutral, shunting one of the motors, and then connecting the motors between the two outside mains, preserving the connection to the neutral between the two motors.

2. The art of controlling electric motors by the three-wire system, which consists in connecting two motors between an outside main and the neutral, and then connecting them between the two outside mains, preserving the connection to the neutral between the two motors.

3. The art of controlling electric motors by the three-wire system, which consists in connecting the two motors between an outside main and the neutral, with a resistance in series with the motors, cutting out the resistance, then reinserting the resistance and shunting one of the motors, and then connecting them respectively between the two outside mains and the neutral.

4. The art of controlling electric motors by the three-wire system, which consists in connecting the two motors in series with a resistance between an outside main and the neutral, then cutting out the resistance, then reinserting the resistance and shunting one of the motors, then connecting them respectively between the two outside mains and the neutral, and cutting out the resistance.

5. The art of controlling electric motors by the three-wire system, which consists in connecting them in series between an outside main and the neutral, with a resistance in series with the motors, cutting out the resistance, then reinserting the resistance and shunting one of the motors, opening the circuit of the shunted motor, then connecting them respectively between the outside mains and the neutral with a resistance between the motors and the ground or neutral connection, and then gradually cutting out the resistance.

6. A three-wire system of electric supply, motors geared to and simultaneously driving a common load and connected one between the positive conductor and the neutral and the other between the negative conductor and the neutral, and means for regulating the motors.

7. A controlling mechanism for two electric motors provided with contacts and connections arranged to connect both the motors between an outside main and the neutral in a series-multiple or three-wire system, and then to connect them each upon one side of the system, between an outside main and the neutral.

8. A controlling mechanism for a number of electric motors geared to a common load, provided with contacts and connections arranged to connect them in series between an outside main and the neutral in a series-multiple or three-wire system, and then to connect them each upon one side of the system, between an outside main and the neutral.

9. In combination, a pair of motors geared to a common load, a three-wire system of supply for the motors, and means arranged to connect one motor between the positive conductor and the neutral, and the other between the negative conductor and the neutral, to regulate the motors.

10. The combination of electric motors, a three-wire system of supply therefor, and means for connecting the motors between an outside main and the neutral, shunting part of the motors, and connecting them between the two outside mains with a connection to the neutral between them.

11. The combination of a pair of motors, a three-wire system of supply therefor, and means arranged to connect the motors between an outside main and the neutral, with a resistance in series with the motors, to cut out the resistance, to reinsert the resistance and shunt one of the motors, and then to connect them respectively between the two outside mains and the neutral.

In witness whereof I have hereunto set my hand this 2d day of August, 1895.

WILLIAM B. POTTER.

Witnesses:
A. F. MACDONALD,
B. B. HULL.